United States Patent
Himeno

(10) Patent No.: US 7,233,784 B2
(45) Date of Patent: Jun. 19, 2007

(54) METHOD FOR SELECTING WIRELESS PATH OF PORTABLE COMMUNICATION TERMINAL, PORTABLE COMMUNICATION TERMINAL AND WIRELESS COMMUNICATION SYSTEM FOR USE THEREOF

(75) Inventor: Yasuhiro Himeno, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 11/023,381

(22) Filed: Dec. 29, 2004

(65) Prior Publication Data

US 2005/0148319 A1 Jul. 7, 2005

(30) Foreign Application Priority Data

Jan. 7, 2004 (JP) ............................. 2004-002177

(51) Int. Cl.
*H04M 11/00* (2006.01)

(52) U.S. Cl. ...................... 455/408; 455/405; 455/406; 455/407; 455/409; 455/414.1; 379/114.01; 379/114.02; 379/114.05; 379/114.06; 379/114.07; 379/114.08

(58) Field of Classification Search ................ 455/405, 455/406, 407, 408, 409, 414.1, 414.2, 414.3, 455/414.4, 114.02, 114.03, 114.05, 114.06, 455/114.07, 114.08, 114.09, 114.1; 379/100.04, 379/114.01

See application file for complete search history.

(56) References Cited

U.S. PATENT DOCUMENTS

| | | | | |
|---|---|---|---|---|
| 5,303,297 | A * | 4/1994 | Hillis | ........................ 455/406 |
| 5,828,737 | A * | 10/1998 | Sawyer | .................. 379/114.07 |
| 6,044,261 | A * | 3/2000 | Kazmi | ........................ 455/408 |
| 6,230,017 | B1 * | 5/2001 | Andersson et al. | ....... 455/456.6 |
| 6,408,174 | B1 * | 6/2002 | Steijer | ........................ 455/407 |
| 6,577,717 | B1 * | 6/2003 | Henon | .................... 379/114.01 |
| 6,597,918 | B1 * | 7/2003 | Kim | ........................... 455/466 |
| 6,681,106 | B2 * | 1/2004 | Marsh et al. | ................ 455/408 |
| 6,801,777 | B2 * | 10/2004 | Rusch | ...................... 455/452.2 |
| 7,058,387 | B2 * | 6/2006 | Kumar et al. | ............... 455/406 |
| 2002/0049729 | A1 * | 4/2002 | Umekawa | ....................... 707/1 |
| 2002/0058522 | A1 * | 5/2002 | Kim et al. | ................... 455/466 |
| 2002/0059434 | A1 * | 5/2002 | Karaoguz et al. | ........... 709/228 |
| 2002/0102963 | A1 * | 8/2002 | Heinonen et al. | ........... 455/406 |
| 2003/0043773 | A1 | 3/2003 | Chang | |

(Continued)

FOREIGN PATENT DOCUMENTS

EP 1 207 656 5/2002

(Continued)

*Primary Examiner*—Jean Gelin
*Assistant Examiner*—Olumide Ajibade-Akonai
(74) *Attorney, Agent, or Firm*—Whitham Curtis Christofferson & Cook, PC

(57) ABSTRACT

A wireless communication system comprises a portable telecommunication terminal and a server unit possessed by the communication service provider for the portable communication terminal. The portable communication terminal has a first communication section performing a communication by way of a first wireless path to which flat rate billing system is applied, a second communication section performing a communication a communication by way of a second wireless path to which measured rate billing system is applied; and a communication control section, detecting a candidate for wireless path being available at the current position and, performing a communication at the current location by the first communication section when the first wireless path is detected as a candidate for wireless path.

13 Claims, 6 Drawing Sheets

U.S. PATENT DOCUMENTS

2003/0142653 A1    7/2003    Jiang et al.

FOREIGN PATENT DOCUMENTS

| EP | 1207656 A2 * | 5/2002 |
| EP | 1 326 379 | 7/2003 |
| JP | 08-130594 | 5/1996 |
| JP | 10-178503 | 6/1998 |
| JP | 2000-134260 | 5/2000 |
| JP | 2001-34260 | 5/2000 |
| JP | 2002-64869 | 2/2002 |
| WO | WO 01/35585 | 5/2001 |

* cited by examiner

FIG.2

```
☐ LINE A (FLAT RATE, 384kbps)
--------------------------------------------------
☐ LINE B (MEASURED RATE, 1Mbps)
   ACQUISITION UPPER LIMIT
      ● UP TO [ 20480 ] KB/MONTH/UP TO ¥ [ 2,000 ]/MONTH
      ○ NO LIMIT
   DOWNLOAD CATEGORY
      ▣ TEXT (txt, html, ETC.)
      ▣ IMAGE (jpg, gif, png, ETC.)
      ☐ MUSIC (wav, mp3, mid, ETC.)
      ☐ PICTURE (mov, avi, 3gp, ETC.)
      ☐ OTHER
   SIZE
      ○ ACQUIRE UP TO [    ] KB
      ● NO LIMIT
```

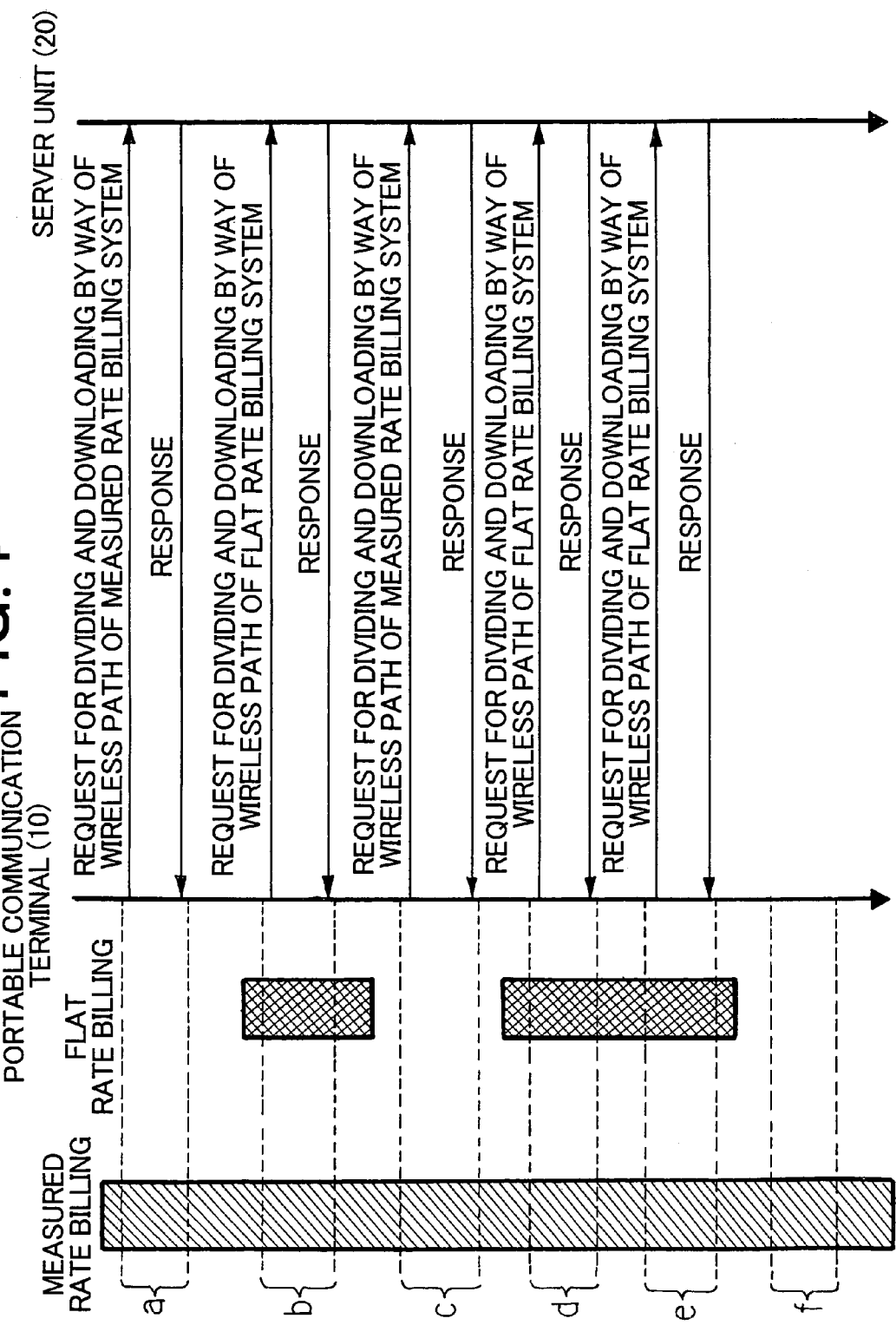

FIG.5

- ▣ LINE A (FLAT RATE, 384kbps)
- - - - - - - - - - - - - - - - - - - - - - - - - - - - - - - -
- ▣ LINE B (MEASURED RATE, 1Mbps)
  - ACQUISITION UPPER LIMIT
    - ◉ UP TO [ 20480 ] KB/MONTH/UP TO ¥ [ 2,000 ]/MONTH
    - ○ NO LIMIT
  - DOWNLOAD CATEGORY
    - ▣ TEXT (txt, html, ETC.)
    - ▣ IMAGE (jpg, gif, png, ETC.)
    - ☐ MUSIC (way, mp3, mid, ETC.)
    - ☐ PICTURE (mov, avi, 3gp, ETC.)
    - ☐ OTHER
  - SIZE
    - ○ ACQUIRE UP TO [    ] KB
    - ◉ NO LIMIT
- - - - - - - - - - - - - - - - - - - - - - - - - - - - - - - -
- ▣ LINE C (FLAT RATE, 1.2Mbps)
- - - - - - - - - - - - - - - - - - - - - - - - - - - - - - - -
- ☐ LINE D (MEASURED RATE, 512kbps)
  - ACQUISITION UPPER LIMIT
    - ○ UP TO [    ] KB/MONTH/UP TO ¥ [    ]/MONTH
    - ○ NO LIMIT
  - DOWNLOAD CATEGORY
    - ☐ TEXT (txt, html, ETC.)
    - ☐ IMAGE (jpg, gif, png, ETC.)
    - ☐ MUSIC (way, mp3, mid, ETC.)
    - ☐ PICTURE (mov, avi, 3gp, ETC.)
    - ☐ OTHER
  - SIZE
    - ○ ACQUIRE UP TO [    ] KB
    - ○ NO LIMIT

METHOD FOR SELECTING WIRELESS PATH OF PORTABLE COMMUNICATION TERMINAL, PORTABLE COMMUNICATION TERMINAL AND WIRELESS COMMUNICATION SYSTEM FOR USE THEREOF

BACKGROUND OF THE INVENTION

1. Field of the Invention

This invention relates to a technique for a portable communication terminal capable of utilizing a plurality of wireless paths with different billing systems to select a communication path.

2. Description of Related Art

It has been made possible for a portable communication terminal such as a portable telephone set to access a communication network and acquire a data file of music, pictures or the like from a given server device. Patent Document 1 (JP-3164085B) and Patent Document 2 (JP 2002-64869A) disclose techniques for reducing the communication cost of such a service. When the volume of communication data to be transmitted between a client and a server exceeds a predetermined level in the system disclosed in Patent Document 1, the data to be transmitted is divided and sent out by way of a communication network with a measured rate billing system and a communication network with a connection time billing system. A portable wireless terminal of Patent Document 2 uses a non-public wireless line for downloading contents and a public mobile communication system for settlement of accounts.

However, with the system of Patent Document 1, if the contents are partly transmitted by way of a communication network with a connection time billing system, it will be difficult to reduce the communication cost because the transmission time becomes longer as the communication data increases. The system of Patent Document 2, on the other hand, is accompanied by a problem that the mobility of the user who is trying to download contents is limited because all the contents have to be acquired from a given server by way of a non-public wireless line and hence the user has to remain in the area where the line can be captured.

SUMMARY OF THE INVENTION

In view of the above-identified problems, it is therefore an object of the present invention to provide a method of selecting a wireless path that allows a smooth communication to take place, while suppressing the communication cost by means of a portable communication terminal.

According to an aspect of the present invention, there is provided a method for selecting a wireless path of a portable communication terminal capable of using a first wireless path to which flat rate billing system is applied and a second wireless path to which measured rate billing system is applied, the method comprising: detecting a candidate for wireless path being available at the current location; and performing a communication at the current location using the first wireless path when the first wireless path is detected as a candidate for wireless path.

According to another aspect of the present invention, there is provided a portable communication terminal comprising: a first communication section performing a communication by way of a first wireless path to which flat rate billing system is applied; a second communication section performing a communication a communication by way of a second wireless path to which measured rate billing system is applied; and a communication control section, detecting a candidate for wireless path being available at the current position and, performing a communication at the current location by the first communication section when the first wireless path is detected as a candidate for wireless path.

According to still another aspect of the invention, there is provided a wireless communication system comprising: a portable communication terminal according to the invention as defined above; and server unit communicably connected to the portable communication terminal; wherein the server unit provides the portable communication terminal with a data file; and each of the first communication section and the second communication section of the portable communication terminal requests the server unit to provide a data file and acquires the data file.

According to the invention, it is possible for a portable communication terminal to use a line of flat rate billing system with priority in order to suppress the communication cost. Additionally, even if the portable communication terminal is in an area where a line of flat rate billing system is not available, the user can try to use a line of measured rate billing system. As a result, it is possible to use a portable communication terminal in various place.

BRIEF DESCRIPTION OF THE DRAWINGS

FIG. 2 is an illustration of an operation of selecting wireless paths in the embodiment of FIG. 1;

FIG. 4 is an illustration of an example of selecting wireless path of the embodiment of FIG. 2;

FIG. 5 is an illustration of an operation of selecting wireless path in another embodiment of wireless communication system according to the invention.

DETAILED DESCRIPTION OF THE PREFERRED EMBODIMENTS

First Embodiment

Figure 1:
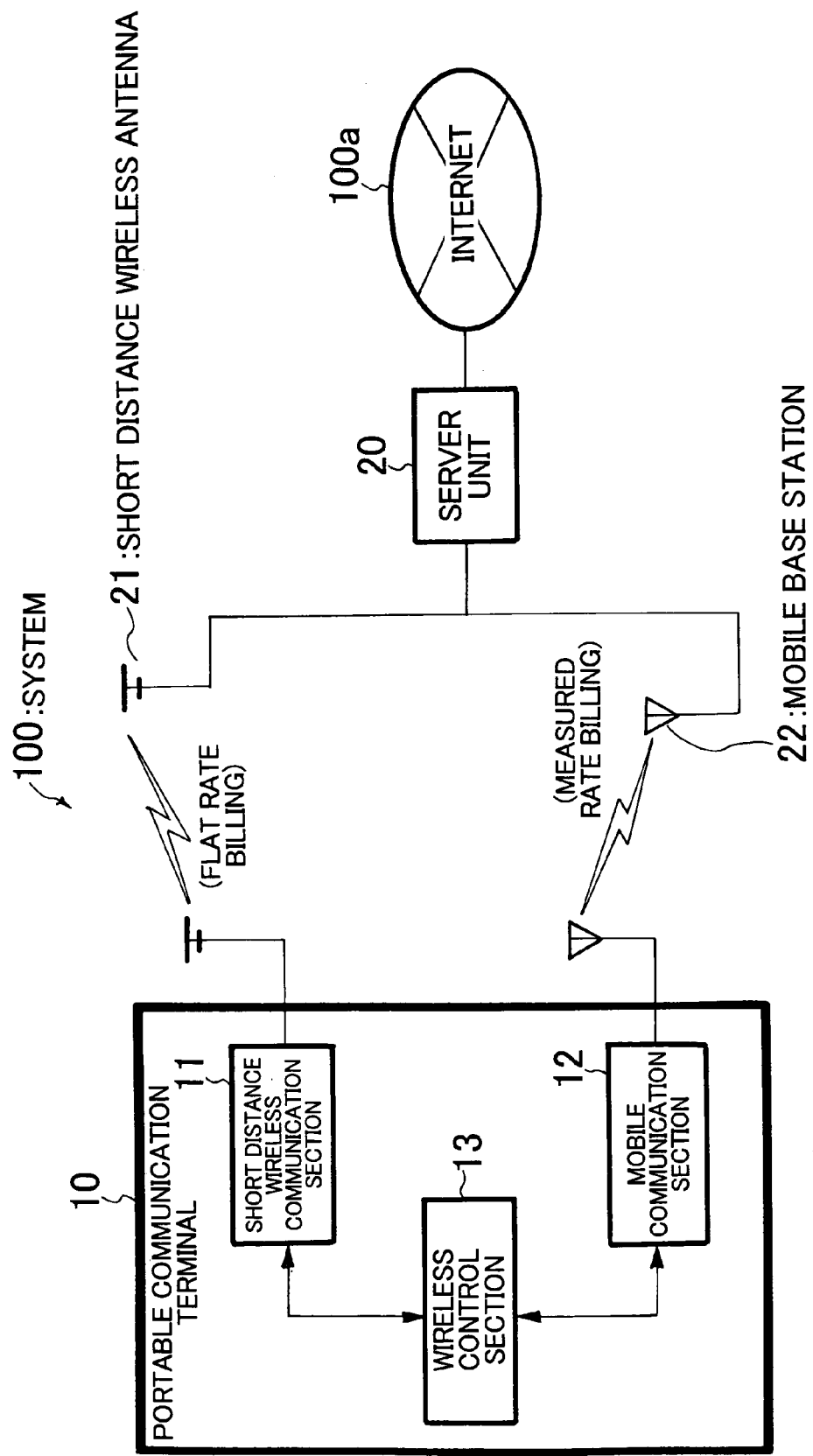
FIG. 1 is a schematic block diagram of an embodiment of wireless communication system according to the invention, illustrating the configuration thereof.

Now, the present invention will be described in greater detail by referring to the accompanying drawings that illustrate preferred embodiments of the invention. FIG. 1 is a schematic block diagram of an embodiment of wireless communication system according to the invention, illustrating the configuration thereof. Referring to FIG. 1, the system 100 of the embodiment comprises a portable communication terminal 10, which may typically be a portable telephone set or a personal information terminal for schedule management and some other purposes, and a server unit 20 possessed by the telecommunication service provider for the portable communication terminal 10 that is connected to an Internet 100*a*.

The telecommunication service provider possessing the server unit 20 provides a service of delivering contents such as music, pictures or the like to the user's portable communication terminal 10 by means of wireless communications using a short distance wireless communication system like a wireless LAN or a packet communication system for portable telephone sets. The telecommunication service provider applies a flat rate billing system, which charges a fixed amount for a predetermined period regardless of the time spent for communications and the volume of received data, to a short distance wireless communication system. And the telecommunication service provider applies a measured rate billing system, which charges an amount determined as a function of the acquired data, to a packet communication system.

As shown in FIG. 1, the portable communication terminal 10 includes a short distance wireless communication section 11 having a short distance wireless communication feature, a mobile communication section 12 having a wireless communication feature like that of a portable telephone set and a wireless control section 13 for selectively driving the short distance wireless communication section 11 or the mobile communication section 12 in the portable communication terminal 10. A wireless LAN standard such as IEEE802.11b or IEEE802.11g or Bluetooth® that is a known short distance wireless communication standard may be applied to the short distance wireless communication section 11.

The server unit 20 includes a short distance wireless antenna 21 for communicating with the short distance wireless communication section 11 and the mobile communication section 12 of the portable communication terminal 10 and a mobile base station 22. It acquires a data file on the Internet 100a in response to a request from the portable communication terminal 10 and supplies the data file to the portable communication terminal 10. The short distance wireless antenna 21 is arranged at a public place such as a railway station or a shopping center. The server unit 20 provides short distance wireless communication services in the communication area of the short distance wireless antenna 21 to the registered user who has paid a registration fee of a predetermined amount.

The user of the system 100 of this embodiment applies for registration in advance for the use of the wireless paths of the telecommunication service provider possessing the server unit 20 by means of a registration form image as illustrated in FIG. 2. The illustrated registration image shows an example which is registered for using "line A" of a flat rate billing system and "line B" of a measured rate billing system.

The part for the "line B" of the registration form image of FIG. 2 includes "acquisition conditions" for specifying the upper limit of data volume that the user can acquire from the server unit 20 and that of communication charge for data acquisition on a monthly basis, a "download categories" item for specifying the category of the file that the user downloads from the server unit 20 and a "size" item for specifying the upper limit of file size that can be downloaded. The communication charge is suppressed from infinitely increasing by providing restrictions for communications by way of the line of measured rate billing system.

Under the "acquisition upper limit" item of FIG. 2, the maximum volume of data that can be acquired per month is defined to be "20480 KB" at the cost of "¥2,000" as computed according to the measured rate billing system of the telecommunication service provider as "acquisition conditions". Under the "download categories" item, it is defined that the user can acquire files of the data formats of "text (txt, htmls", etc.)" and "image (jpg, gif, png, etc)" but cannot acquire files of the data formats of "music (wav, mp3, mid, etc)" and "picture (mov, avi, 3gp, etc.)".

Additionally, while "no limit" is selected under the "size" item in the illustrated instance, it is possible to define the limit for acquiring data per file. If "acquirable up to 10 KB" is defined, the user cannot download a file whose file size exceeds "10 KB". The user makes a user registration to the server unit 20 by means of the illustrated registration image from the portable communication terminal 10 or a personal computer.

The portable communication terminal 10 and the server unit 20 can exchange a data file of contents that are to be downloaded by dividing the data file. As for the technique for dividing and downloading a file, for example, a byte range request of RFC2616 as defined by the IETF (Internet Engineering Task Force) may be utilized if HTTP is used as communication protocol. It is possible to divide the file to be downloaded into packets of a predetermined volume of data to acquire the file by defining the byte range. Even if the HTTP communication is interrupted, it is not necessary to receive the file from the beginning when the communication is resumed. In other words, it is possible to begin to receive the file from the remaining part when the communication is resumed. When a file is divided for downloading, it is desirable to know the size of the file in advance typically by a HEAD request of HTTP. However, it should be noted that techniques that can be used for dividing and downloading a file is not limited to the above described one and a program that the user creates may be used for that purpose.

Figure 3:
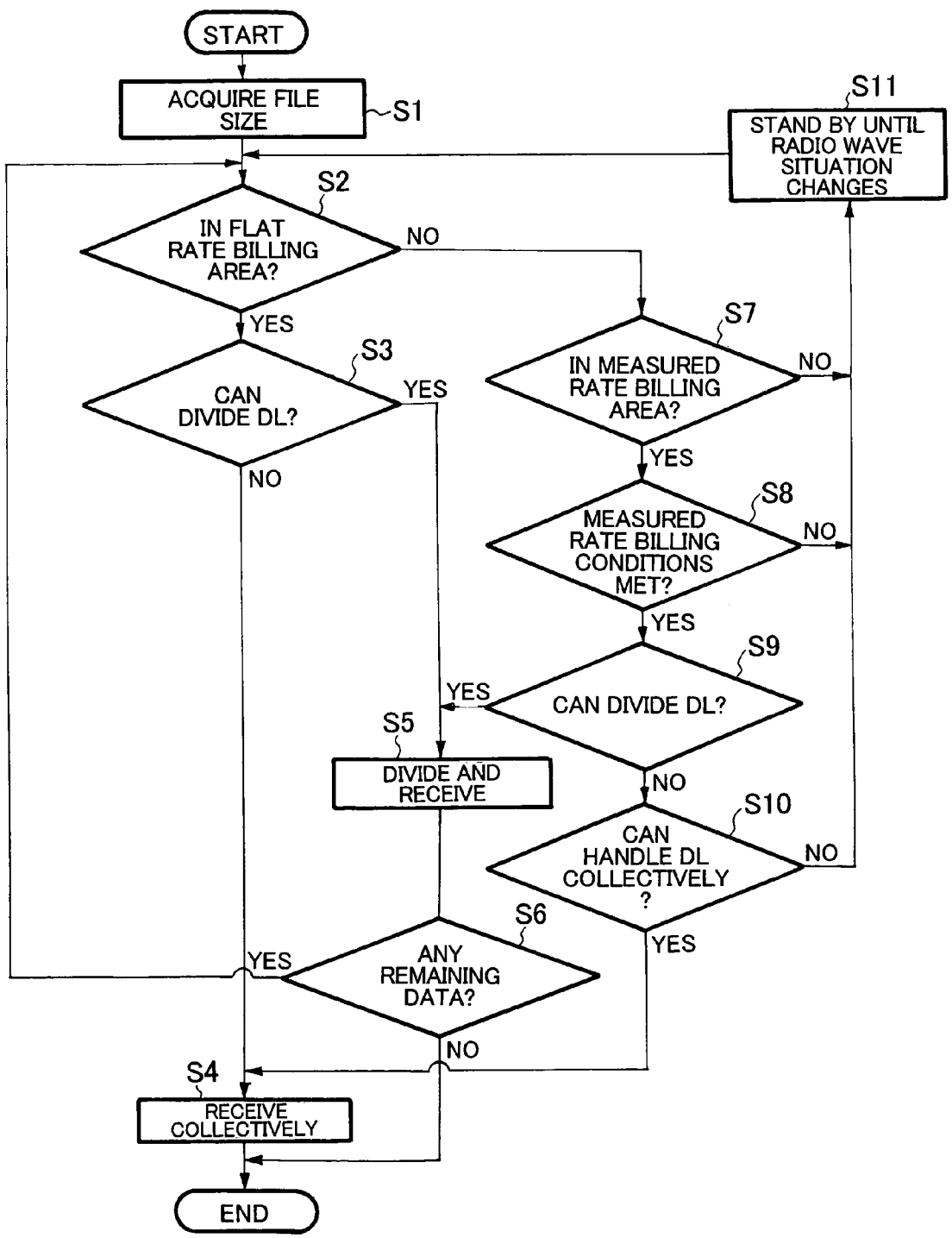
FIG. 3 is a flow chart of the operation procedure of the portable communication terminal of the embodiment of FIG. 1.

Now, the sequence of operation of the system 100 of the embodiment will be described by referring to the flow chart of FIG. 3. Firstly, the user of the portable communication terminal 10 requests the server unit 20 to download the file of certain contents by operating the terminal 10. Then, the server unit 20 notifies the portable communication terminal 10 of the size of the file (Step S1).

Then, the wireless control section 13 of the portable communication terminal 10 detects a candidate for wireless path available at the current location of the terminal 10 and determines if the candidates include at a line of flat rate billing system or not. If, it is determined that there is a line of flat rate billing system as a result (Step S2: Yes), the wireless control section 13 orders the short distance wireless communication section 11 to download the data file. If the data file cannot be divided and downloaded from the server unit 20 to the portable communication terminal 10 (Step S3: No), the short distance communication section 11 receives the data file supplied from the server unit 20 by way of the short distance wireless antenna 21 collectively at a time (Step S4).

If, on the other hand, the data file can be divided and downloaded from the server unit 20 to the portable communication terminal 10 (Step S3: Yes), the short distance wireless communication section 11 requests the server unit 20 to divide and download the data file, and sequentially receives the divided file from the server unit 20 that received the request. In this stage of operation, the short distance wireless communication section 11 checks if the current location is found in the communication area of the flat rate billing system or not each time the communication section 11 receives a succeeding part of the divided file (Step S6: Yes). The processing operation ends when all the divided file is received (Step S6: No).

If the wireless control section 13 of the portable communication terminal 10 determines that no line of flat rate billing system is available at the current location at the time of starting the downloading operation or during the operation of dividing and downloading the file (Step S2: No) but a line of measured rate billing system is available (Step S7: Yes), the section 13 then determines if it can proceed with the current downloading operation by referring to the respective conditions for the measured rate billing system described above by referring to FIG. 2. If the wireless control section 13 determines that it can proceed with the current downloading operation (Step S8: Yes) and can divide and download the file (Step S9; Yes), the section 13 drives the mobile communication section 12, which is responsible for utilizing a line of measured rate billing system, to carry out an operation of dividing and downloading the file from the server unit 20 in a manner as described above (Steps S5 and S6).

If, on the other hand, it is determined that the portable communication terminal 10 cannot divide and download the file by a line of measured rate billing system (Step S9: No), the wireless control section 13 determines if it can download the file collectively by referring to the definition of the "size" item in FIG. 2 and, if the section 13 determines that it can download the file collectively (Step S10: Yes), the wireless control section 13 drives the mobile communication 12 to collectively download the data file (Step S4).

If it is found that the portable communication terminal 10 can neither make any wireless communication at the current location (Step S7: No) nor meet the conditions for using a line of measured rate billing system (Step S8: No) nor is it possible for the portable communication terminal 10 to collectively download the file by a line of measured rate billing system (Step S10: No), the terminal 10 stands by until the radio wave situation changes as the user moves to change its location (Step S11) and, once it gets into an area where a line of flat rate billing system is available (Step S2: Yes), it starts downloading the file.

Now, an instance where the wireless control section 13 of the portable communication terminal 10 dynamically switches the wireless path depending on the radio wave situation of the current location will be described by referring to FIG. 4. Referring to FIG. 4, when there is no line of flat rate billing system that is available at the current location of the portable communication terminal 10 and (a) it is possible to use a line of measured rate billing system, the wireless control section 13 orders the mobile communication section 12 to download the file and, when (b) a line of flat rate billing system becomes available during the mobile communication section 12 is operating to download the file because of a change in the radio wave situation, the wireless control section 13 switches from the mobile communication section 12 to the short distance wireless communication section 11 to download the remaining part of the divided file.

If (c) the line of flat rate billing system becomes no longer available because the user moves out of the communication area or an obstruction comes into the scene for the radio wave while the short distance wireless communication section 11 is operating to download the file, the wireless control section 13 switches from the line of flat rate billing system to a line of measured rate billing system to download the remaining part of the divided file. Subsequently, when (d) a line of flat rate billing system is captured, the wireless control section 13 drives the short distance wireless communication section 11 to continue the operation of downloading the remaining part of the divided file regardless if (e) the line of measured rate billing system is still available or not. If (f) no wireless path is available at all, the wireless control section 13 suspends the downloading operation until the radio wave situation changes.

As described above, when the portable communication terminal 10 of the system 100 of the embodiment acquires a data file of contents from the server unit 20, the wireless control section 13 operates so as to use a line of flat rate billing system with priority to consequently suppress the communication cost of the downloading operation. It is known that short distance wireless communication services such as wireless LANs provide only a small communication area. However, according to the present invention, if the portable communication terminal 10 moves out of a communication area while the short distance wireless communication section 11 is downloading a divided data file, the wireless control section 13 automatically switches from the short distance wireless communication section 11 to the mobile communication section 12 so that the user can quickly acquire the contents he or she wants.

Other Embodiments

While the sequence of operation according to which the portable communication terminal 10 drives either the short distance wireless communication section 11 or the mobile communication section 12 to download a single data file is described above for the first embodiment, it is also possible to download a plurality of data files in parallel by way of a plurality of wireless paths according to the invention. Therefore, it is possible to efficiently acquire a plurality of data files. If "line A" of flat rate billing system and "line B" of measured rate billing system are available as shown in FIG. 2, the communication cost of the downloading operation can be suppressed by using "line A" of flat rate billing system to download a file with a large data volume.

It is also possible to use a plurality of wireless paths to which a same billing system is applied as another technique of acquiring a plurality of data files in parallel. For example, according to the invention, it is possible to make both "line A" and "line C" of flat rate billing system available in addition to "line B" of measured rate billing system as shown in FIG. 5. Now, assume that wireless channels that can avoid mutual interference are assigned to "line A" and "line C" is used when the data volume of the data file to be acquired is found under the "acquisition upper limit". With such an arrangement, it is possible to acquire three data files in parallel theoretically at a rate up to about 2.5 Mbps (384 kbps+1 Mbps+1.2 Mbps) in areas where three lines of "line A", "line B" and "line C" are available.

Figure 6:
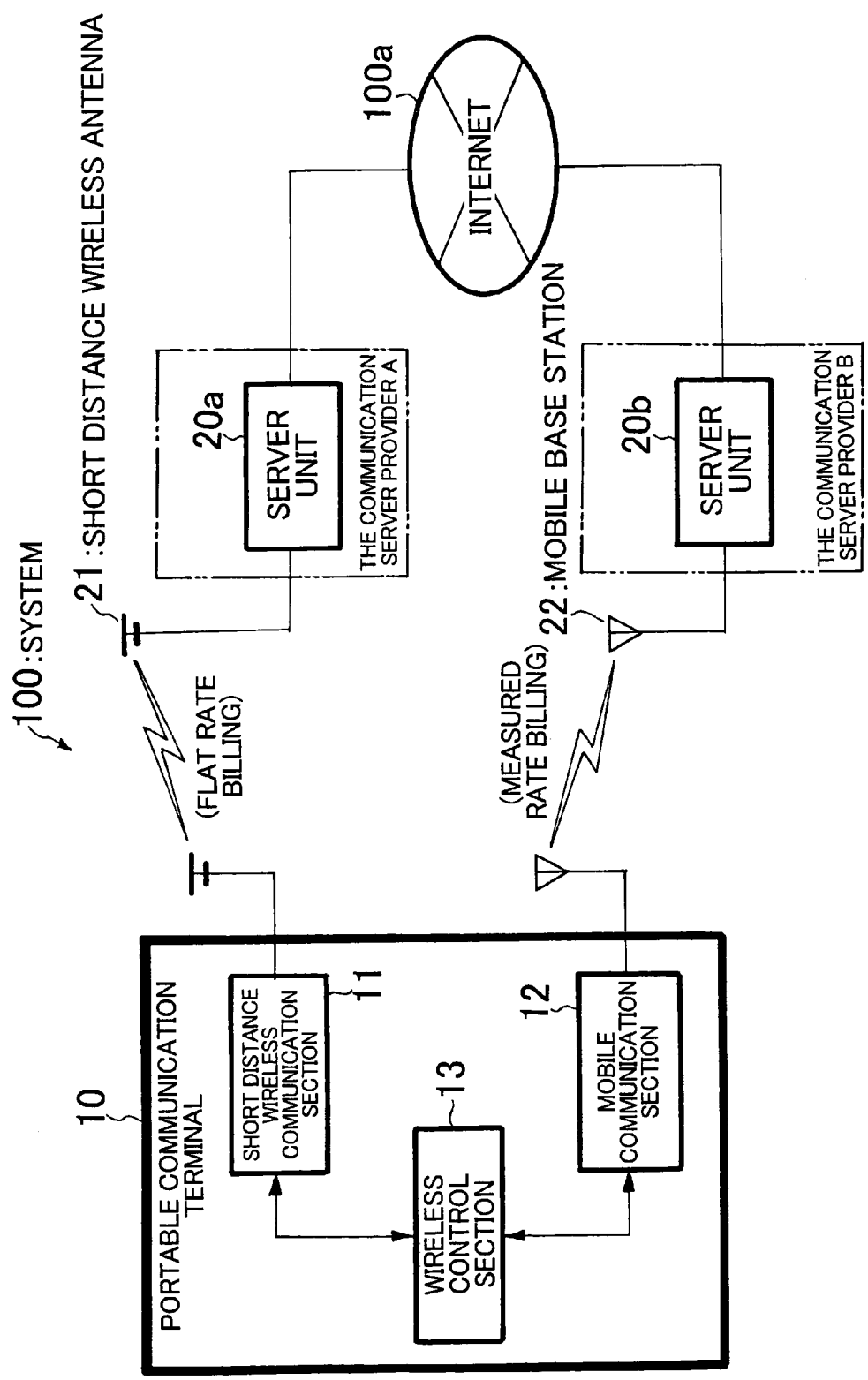
FIG. 6 is a schematic block diagram of the embodiment of wireless communication system of FIG. 5, illustrating the configuration thereof.

While a plurality of wireless paths that the portable communication terminal 10 can use are provided by a single telecommunication service provider having a server unit 20 in the description of the first embodiment given above by referring to FIG. 1, the user may alternatively concludes separate agreements with telecommunication service providers A and B for a line of flat rate billing system and a line of measured rate billing system as shown in FIG. 6. In a system 101 having such a configuration, the short distance wireless communication section 11 of the portable communication terminal 10 communicates with a server unit 20a having a short distance wireless antenna 21, while the mobile communication section 12 communicates with a server unit 20b having a mobile base station 22. A system having a configuration as shown FIG. 6 is advantageous for an application where a data file is downloaded collectively or a plurality of data files are downloaded in parallel.

When a portable telephone set is used as portable communication terminal according to the invention, a line of measured rate billing system that is used for ordinary telephone communications and a line of flat rate billing system that is used for so-called IP telephone communications, using VoIP (Voice over Internet Protocol), can be selectively used for exchanging audio call signals for telephone communications. If the portable telephone set has a video phone feature, it is possible to selectively use a line of measured rate billing system conforming to a moving image communication standard such as 3G-324M and a line of flat rate billing system using a protocol for video phone communications such as H.323 or SIP (Session Initiation Protocol).

If a portable telephone set as described above is used, a line of flat rate billing system is selected with priority. It may be so arranged that, when the communication data volume exceeds the volume limit defined for the flat rate billing system, the excessive data is transmitted by a line of measured rate billing system. Additionally, when a plurality of lines of measured rate billing system are provided, it is desirable to select a line of measured rate billing system that can transmit data at the lowest cost with priority when a line of flat rate billing system is switched to a line of measured rate billing system.

What is claimed is:

1. A method for downloading a data file to a portable communications terminal comprising:
  said portable communication terminal automatically selecting from a first wireless path having flat rate billing and a second wireless path having measured rate billing, said automatic selecting including:
  detecting whether said first wireless path is available to said portable communications terminal for downloading said file at the current location and
  in response to detecting that said first wireless path is available at said current location, said portable communication terminal downloading said file using said first wireless path, and
  in response to detecting that said first wireless path is not available at said current location, detecting whether said second wireless path is available and, in response to detecting that said second path is available, said portable communication terminal downloading said file from said second wireless path.

2. The method of claim 1, wherein said portable communication terminal, while downloading said data file through said second path, repeats said detecting whether said first path is available and, in response to detecting said first wireless path becoming available prior to completion of the downloading, switches to download a remainder of said data file from said first wireless path.

3. The method of claim 1, wherein said portable communication terminal acquires a data file from a server unit connected to a network by communication at the current location.

4. The method of claim 3, wherein
  said portable communication terminal requests said server unit to divide and supply a data file;
  said server unit, in response to said request, divides the data file and sequentially transmits each part of said data file to said portable communication terminal; and
  said portable communication terminal performs said selecting every time each part of said data from said server unit is received.

5. The method of claim 3, further comprising:
  said portable communication terminal requesting said server unit to transmit a plurality of data files; and
  said server unit, in response to said requesting, sends different data files corresponding to said data files requested by said portable communication terminal to said first and second wireless paths, wherein
  said selecting further includes detecting whether said first and said second wireless paths are concurrently available to said portable unit at said current location, and
  in response to said selecting detecting that said first and second wireless paths are available to said portable unit at said current location, said portable communication terminal downloads at least a first of the data files transmitted from said server unit by way of said first wireless path and concurrently, with at least a portion of said downloading, downloads another of said data files by way of said second wireless path.

6. The method of claim 1, wherein said portable communication terminal transmits an audio call signal during said downloading at the current location.

7. The method of claim 1, wherein said portable communication terminal transmits a video call signal during said downloading at the current location.

8. A portable communication terminal comprising:
  a first communication section for wireless connecting to a first wireless path, said first wireless path having flat rate billing;
  a second communication section for wireless connecting to a second wireless path, said second wireless path having measured rate billing;
  a communication control section, for automatically selecting, in response to a request for downloading a data file, among said first wireless path and said second wireless path for downloading said file,
  wherein said communication control section is constructed and arranged to perform said automatic selecting by first detecting whether said first wireless path is available to said portable communications terminal for downloading said file at the current location and
  in response to detecting that said first wireless path is available at said current location, controlling said first communication section to download said file to said portable communication terminal using said first wireless path, and
  in response to detecting that said first wireless path is not available at said current location, detecting whether said second wireless path is available and, in response to detecting that said second path is available, controlling said second communication section to download said file to said portable communication terminal using said second wireless path.

9. The portable communication terminal of claim 8, wherein said communication control section is constructed and arranged such that, when controlling said communication second section to download said data file using said second path, it repeats said detecting whether said first path is available and, in response to detecting said first wireless path becoming available prior to completion of the downloading, switches to control said first communication section to download a remainder of said data file using said first wireless path.

10. The portable communication terminal of claim 8, wherein
  said communication control section is constructed and arranged to control said first and second communication sections to download a data file in divided parts, and
  said communication control section repeats said selecting every time each of said parts is received.

11. The Portable communication terminal of claim 8, wherein said communication control section is further constructed and arranged to detect whether said first and said second wireless paths are concurrently available to said portable unit at said current location and, in response to said detection, and is constructed and arrange to control, based on said detecting, said first communication section to download a data file using said first wireless path concurrent with second communication sections downloading at least a second data files using said second wireless path.

12. The portable communication terminal of claim 8, wherein each of said first and second communication sections is constructed and arranged to transmit an audio call signal during said downloading at the current location.

13. The portable communication terminal of claim 8, wherein each of said first and second communication sections is constructed and arranged to transmit a video call signal during said downloading at the current location.

* * * * *